US009888458B2

(12) United States Patent
Lim et al.

(10) Patent No.: US 9,888,458 B2
(45) Date of Patent: Feb. 6, 2018

(54) METHOD AND APPARATUS FOR PERFORMING DEVICE-TO-DEVICE COOPERATIVE COMMUNICATION IN WIRELESS ACCESS SYSTEM

(75) Inventors: Dongguk Lim, Anyang-si (KR); Hangyu Cho, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 256 days.

(21) Appl. No.: 13/984,763

(22) PCT Filed: Dec. 26, 2011

(86) PCT No.: PCT/KR2011/010093
§ 371 (c)(1),
(2), (4) Date: Aug. 9, 2013

(87) PCT Pub. No.: WO2012/108621
PCT Pub. Date: Aug. 16, 2012

(65) Prior Publication Data
US 2013/0308490 A1   Nov. 21, 2013

Related U.S. Application Data

(60) Provisional application No. 61/441,654, filed on Feb. 11, 2011.

(51) Int. Cl.
*H04W 72/04* (2009.01)
*H04B 7/026* (2017.01)
*H04W 4/00* (2009.01)

(52) U.S. Cl.
CPC ............ *H04W 72/04* (2013.01); *H04B 7/026* (2013.01); *H04W 4/005* (2013.01)

(58) Field of Classification Search
None
See application file for complete search history.

(56) References Cited

U.S. PATENT DOCUMENTS 8,537,718 B2 * 9/2013 Etemad .................. H04L 5/003
370/254
2009/0016295 A1 * 1/2009 Li .......................... H04L 5/0007
370/330

(Continued)

FOREIGN PATENT DOCUMENTS

KR   WO 2008032973 A1 *   3/2008   ........... H04L 5/0007
KR   WO 2010036008 A2 *   4/2010   ......... H04B 7/15592
WO   WO 2008032973 A1 *   3/2008

OTHER PUBLICATIONS

Jung, et al., "Study Report on Hierarchical Networks (Revised Working document)," IEEE 802.16 Broadband Wireless Access Working Group, IEEE 802.16ppc-10/0008r2, Nov. 2010, 25 pages (relevant sections: section 2.2.2).

(Continued)

*Primary Examiner* — Charles C Jiang
*Assistant Examiner* — Kyaw Z Soe
(74) *Attorney, Agent, or Firm* — Lee Hong Degerman Kang & Waimey

(57) ABSTRACT

The present invention relates to a method for performing a device-to-device cooperative transmission (D2D CT) using a multi-carrier in a wireless access system, including the steps of: enabling a source device to perform a network entry process with a base station using a primary carrier; enabling the source device to receive control information related to a dedicated carrier used for D2D CT from the base station through the primary carrier; and enabling the source device to transmit an uplink signal to a collaborative device using the dedicated carrier.

15 Claims, 12 Drawing Sheets

(56) References Cited

U.S. PATENT DOCUMENTS

| | | | | |
|---|---|---|---|---|
| 2009/0274096 A1* | 11/2009 | Fu | ............... | H04W 72/06 |
| | | | | 370/328 |
| 2010/0136997 A1* | 6/2010 | Palanki | ............ | H04W 88/04 |
| | | | | 455/452.1 |
| 2010/0165882 A1* | 7/2010 | Palanki | ............ | H04W 76/023 |
| | | | | 370/254 |
| 2011/0026475 A1* | 2/2011 | Lee | ............ | H04L 5/001 |
| | | | | 370/329 |
| 2011/0151887 A1* | 6/2011 | Hakola | ............ | H04L 5/001 |
| | | | | 455/452.2 |
| 2011/0258313 A1* | 10/2011 | Mallik | ............ | H04W 8/005 |
| | | | | 709/224 |
| 2012/0269148 A1* | 10/2012 | Hultell | ............ | H04W 48/08 |
| | | | | 370/329 |
| 2014/0023008 A1* | 1/2014 | Ahn | ............ | H04W 76/023 |
| | | | | 370/329 |

OTHER PUBLICATIONS

Motorola, "Control Channel Design Issues for Carrier Aggregation in LTE-A," 3GPP TSG RAN1 #55, R1-084424, Nov. 2008, 4 pages.
Yuan, et al., "Carrier Aggregation for LTE-Advanced Mobile Communication Systems," LTE Technology Update, IEEE Communications Magazine, Feb. 2010, pp. 88-93.

* cited by examiner

FIG. 3
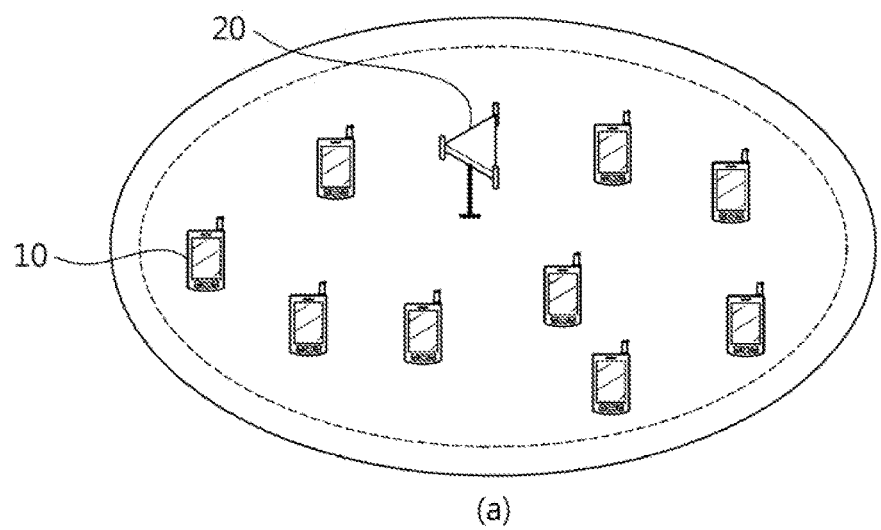
(a)
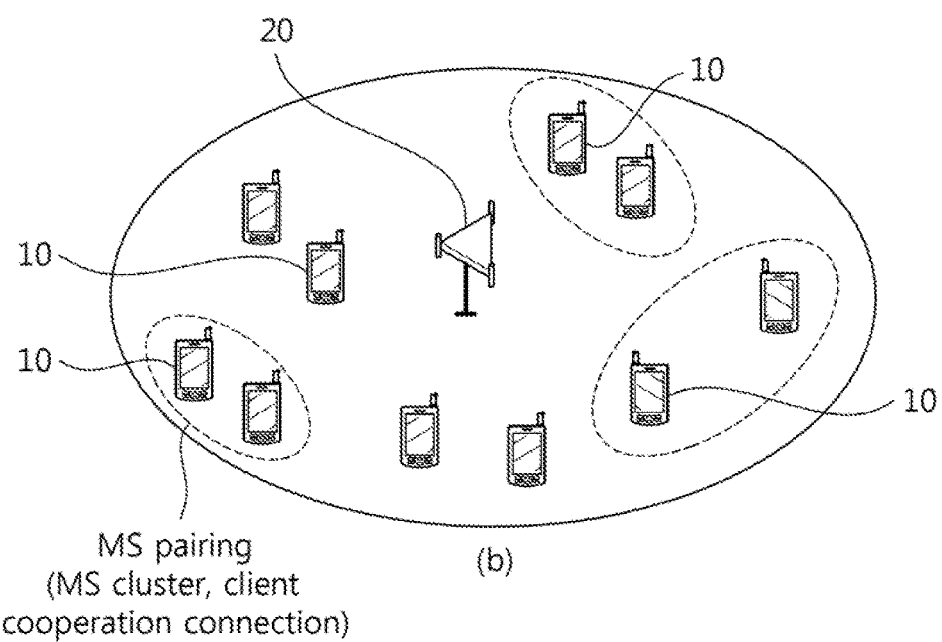
MS pairing
(MS cluster, client
cooperation connection)
(b)

METHOD AND APPARATUS FOR
PERFORMING DEVICE-TO-DEVICE
COOPERATIVE COMMUNICATION IN
WIRELESS ACCESS SYSTEM

CROSS-REFERENCE TO RELATED
APPLICATIONS

This application is the National Stage filing under 35 U.S.C. 371 of International Application No. PCT/KR2011/010093, filed on Dec. 26, 2011, which claims the benefit of U.S. Provisional Application Ser. No. 61/441,654, filed on Feb. 11, 2011, the contents of which are all hereby incorporated by reference herein in their entirety.

BACKGROUND OF THE INVENTION

Field of the Invention

The present invention relates to a wireless access system, and more particularly, to a method and an apparatus for performing a device-to-device cooperative communication by using multi-carriers.

Related Art

Standardization for a cooperative-MIMO (CO-MIMO) and a signal transmission through a relay or femto cell in an IEEE 802.16m system or LTE (-A) system is in progress to enhance transmission efficiency and throughput of mobile stations (MSs) with poor channel status among MSs positioned in a cell.

Further, besides methods of supporting MSs using a base station or a femto cell or relay that operates as a base station as described above, research for cooperative communication (e.g., mobile relaying) that transmits signals through cooperation between MSs or a client cooperation (CC) is recently underway for the 802.16 systems or LTE (-A) systems.

Current cellular wireless transmission systems define transmission/reception methods between a base station and an MS. In such case, the base station may transmit signals to the MS using a femto BS or relay station (RS) so as to effectively transmit signals to the MS.

In the foregoing, the femto-BS or RS plays a role as a base station. In the current IEEE 802.16 and 3GPP LTE/LTE-A standards, signal transmission over links between BS (or femto-BS)-MS, BS-RS, and MS-RS are being actively standardized.

However, more research is being conducted not only on device-to-device communication between the human type device (HTC), but also on device-to-device communication between machine type devices (MTCs) with increasing demand for lower power consumption, transmission reliability, or enhanced throughput.

Signals may be transmitted and received through device-to-device collaborative transmission and relaying in machine to machine (M2M) in order to minimize power consumption or perform power saving. However, when devices perform cooperative communication in a cell, collaborative transmission is performed by using the same carrier as a lot of devices (HTC and MTC), and as a result, it is difficult to perform efficient D2D collaborative transmission due to problems such as interference resource allocation depending on signal transmission by other devices.

SUMMARY OF THE INVENTION

In order to solve the problems, the present invention provides a method and a procedure in which devices transmitting and receiving signals to perform the device-to-device cooperative transmission perform a device-to-device cooperative transmission (D2D_CT) by using a multi-carrier operation so as to efficiently transmit the signals while maintaining low power consumption.

In an aspect, a method for performing a device-to-device cooperative transmission (D2D CT) by using multi-carriers in a wireless access system is provided. The method includes performing, by a source device, a network entry procedure with a base station by using a primary carrier, receiving, by the source device, control information including information related to a dedicated carrier used for the device-to-device cooperative transmission from the base station through the primary carrier, and transmitting, by the source device, an uplink signal to a cooperative device by using the dedicated carrier.

The receiving of the control information may comprise receiving, by the source device, dedicated carrier indication information indicating a dedicated carrier allocated for the device-to-device cooperative transmission among carriers supported by the base station from the base station, and receiving, by the source device, dedicated carrier management information from the base station.

The dedicated carrier indication information may include at least one of information on a physical carrier index, a duplex, a center frequency, a carrier type, and a carrier configuration of the dedicated carrier.

The method may further comprise requesting, by the source device, allocation of the dedicated carrier used for the device-to-device transmission with the cooperative device from the base station by using the control information, and receiving, by the source device, a response corresponding to the request of the allocation of the dedicated carrier from the base station.

The source device may transmit candidate dedicated carrier information for performing the device-to-device cooperative transmission to the base station through the request of the allocation of the dedicated carrier.

The transmitting of the uplink signal may further comprise performing, by the source device, carrier switching from the primary carrier to the dedicated carrier, and the uplink signal may be transmitted to the cooperative device through the switched dedicated carrier.

The method may further comprise receiving, by the source device, information on carriers supported by the base station from the base station, requesting, by the source device, allocation of the dedicated carrier used for the device-to-device cooperative transmission with the cooperative device from the base station, receiving, by the source device, a message to instruct channel measurement of a candidate dedicated carrier from the base station, performing, by the source device, the channel measurement of the candidate dedicated carrier based on the received channel measurement instruction message, and reporting, by the source device, a performing result of the channel measurement to the base station.

The method may further comprise receiving, by the source device, frame structure information indicating a frame structure of the primary carrier or the dedicated carrier from the base station.

The source device may transmit the uplink signal to the cooperative device by using the dedicated carrier in an N-th frame and operate in a power saving mode in subframes other than a first subframe of an (N+1)-th frame.

In another aspect, a method for performing a device-to-device cooperative transmission (D2D CT) by using multi-carriers in a wireless access system is provided. The method includes performing, by a cooperative device, an network entry procedure with a base station by using a primary carrier, receiving, by the cooperative device, control information including information related to a dedicated carrier used for the device-to-device cooperative transmission from the base station through the primary carrier, receiving, by the cooperative device, an uplink signal from the source device through the dedicated carrier, and transmitting, by the cooperative device, the uplink signal received from the source device to the base station by using the dedicated carrier or the primary carrier.

The uplink signal may be received in an N-th frame from the source device and the uplink signal received from the source device is transmitted to the base station in an (N+1)-th frame.

In another aspect, a method for performing, by a base station, a device-to-device cooperative transmission with a source device and a cooperative device by using multi-carriers in a wireless access system is provided. The method includes performing a network entry procedure with the source device and the cooperative device by using a primary carrier, transmitting control information including information related to a dedicated carrier used for the device-to-device cooperative transmission to the source device or the cooperative device through the primary carrier, and receiving the uplink signal of the source device from the cooperative device through the primary carrier or the dedicated carrier.

The transmitting of the control information may comprise transmitting dedicated carrier indication information indicating a dedicated carrier allocated for the device-to-device cooperative transmission among carriers supported by the base station to the source device or the cooperative device, and transmitting dedicated carrier management information to the source device or the cooperative device.

The method may further comprise receiving a message to request allocation of the dedicated carrier used for the device-to-device cooperative transmission from the source device, and transmitting a response message corresponding to the message to request the allocation to the source terminal.

The method may further comprise transmitting frame structure information indicating a frame structure of the primary carrier or the dedicated carrier to the source device or the cooperative device.

In another aspect, an apparatus for performing a device-to-device cooperative transmission (D2D CT) by using multi-carriers in a wireless access system is provided. The apparatus includes a radio frequency unit for transmitting and receiving wireless signals to and from the outside, and a controller coupled to the radio frequency unit. The controller is configured for controlling to perform a network entry procedure with a base station through a primary carrier, controlling the radio frequency unit to receive control information including information related to a dedicated carrier used for the device-to-device cooperative transmission from the base station through the primary carrier, and controlling the radio frequency unit to transmit an uplink signal to a cooperative device by using the dedicated carrier.

According to the present invention, devices that transmit and receive signals can efficiently transmit the signals through a device-to-device cooperative transmission (D2D_CT) while maintaining low power consumption by performing the device-to-device cooperative transmission by using a multi-carrier operation.

BRIEF DESCRIPTION OF THE DRAWINGS

FIGS. 3(a) and (b) shows a concept of a cooperative cluster of mobile stations according to an embodiment of the present invention.

DESCRIPTION OF EXEMPLARY EMBODIMENTS

Figure 1:
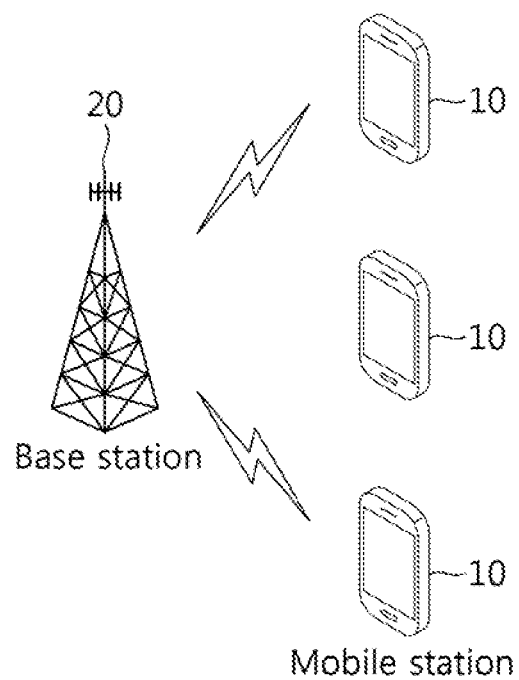
FIG. 1 is a concept diagram showing a wireless communication system according to an embodiment of present invention.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like.

The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS).

3rd generation partnership project (3GPP) long term evolution (LTE) is part of an evolved UMTS (E-UMTS) using the E-UTRA, which employs the OFDMA in downlink and the SC-FDMA in uplink. LTE-A (advanced) is an evolution of 3GPP LTE.

Hereinafter, preferred embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

FIG. 1 is a concept diagram showing a wireless communication system according to an embodiment of present invention. Wireless communication systems may be widely arranged to provide various communication services such as voice, packets, or data.

Referring to FIG. 1, the wireless communication system includes a mobile station 10 (MS) and a base station 20 (BS). The MS 10 may be stationary or mobile and may be referred to by other terms such as a user equipment (UE), a user terminal (UT), a subscriber station (SS), a wireless device or an advanced mobile station (AMS).

Further, in case the wireless communication system shown in FIG. 1 supports device cooperative communication (or transmission), the MS 10 includes the concept of a device cooperation requesting device requesting a device cooperation, a device cooperation accepting device accepting the device cooperation, and a cooperation participating device participating in the device cooperation.

Hereinafter, what is related to client cooperation is briefly described.

Client cooperation (CC) or cooperative communication (CC) refers to transmitting and receiving signals or data through a direct (link) communication between devices and cooperatively transmitting the transmitted/received signals or data to a base station or a device.

Here, devices may be classified, depending on their operation and roles, into non-cooperative terminals, cooperation-capable terminals, cooperation participating terminals, cooperative transmission terminals, and cooperation requesting terminals. The non-cooperative terminals may also be referred to as single transmission terminals. The cooperation-capable terminals may also be referred to as cooperative terminal candidates.

Here, the cooperation participating terminals refer to terminals that participate in client cooperation but do not send data to a base station.

Hereinafter, as used herein, an MS requesting client cooperation may be referred to as a first MS, and an MS accepting client cooperation request, i.e., an MS transmitting UL data of the first MS to the base station, may be referred to as a second MS.

As described above, the first MS may be also referred to a cooperation requesting MS, a source MS (S-MS) or a cooperation subject device, and the second MS may be also referred to a cooperation accepting MS, a cooperating MS (C-MS), a target MS (T-MS), or a cooperated MS. Here, the term "second MS" includes both the cooperative transmission MS and the cooperation participating MS.

In other words, the first MS means an MS that independently attends data transmission/reception with a base station and/or a relay station, and the second MS means an MS that assists in data transmission/reception with a base station and/or a relay station.

Further, a direct transmission between two MSs performing cooperative communication may use single RAT or multi RATs. At this time, in case an MS performing client cooperation supports the multi RAT, a RAT different from a RAT (radio access transmission) used for signal transmission with the base station may be used to perform signal transmission/reception between the two MSs.

Further, the base station transmits information on client cooperation to the two MSs performing client cooperation (source MS and cooperative MS) through a DL signal (e.g., CC_Transmission_info). At this time, the DL signal may contain the following information for CC.

That is, CC_Transmission_info includes information described below in (1) to (6):

(1) Device pairing or grouping information for performing client cooperation, or an MS ID (STID or C-RNTI) of an MS performing CC operation in case grouping or pairing ID is not used (2) Resource allocation information for CC Here, the resource allocation information for CC includes UL resource info assigned by the base station for CC operation, the number of RBs or subbands, indexes of RBs or subbands, start points of symbols or carriers.

(3) Power control offset and initial transmission power (initial Tx power) information (4) Transmission information relating to MIMO, rank, and MCS (5) Time offset information indicating a start of CC operation (6) Information indicating a start of other RAT (other RAT start indicator)

For example, the information indicating a start of other RAT includes channel index information and an indicator for starting Wi-Fi operation.

Client cooperation (or cooperative communication) will be described below in more detail with reference to FIGS. 5 to 11.

The base station 20 is generally a fixed station communicating with the MS 10 and may be referred to by other terms such as a nodeB, a base transceiver system (BTS), or an access point. One or more cells may be included in one base station 20.

The wireless communication system may be an orthogonal frequency division multiplexing (OFDM)/orthogonal frequency division multiple access (OFDMA)-based system.

OFDM uses multiple orthogonal subcarriers. OFDM uses orthogonality between inverse fast Fourier Transform (IFFT) and fast Fourier transform (FFT). In a transmitter, data is subjected to IFFT and is transmitted. In a receiver, a received signal undergoes FFT so that the original data is restored. The transmitter uses IFFT to combine multiple subcarriers, and the receiver uses corresponding FFT to separate the multiple subcarriers.

Heterogeneous-network Wireless Communication Environment

Figure 2:
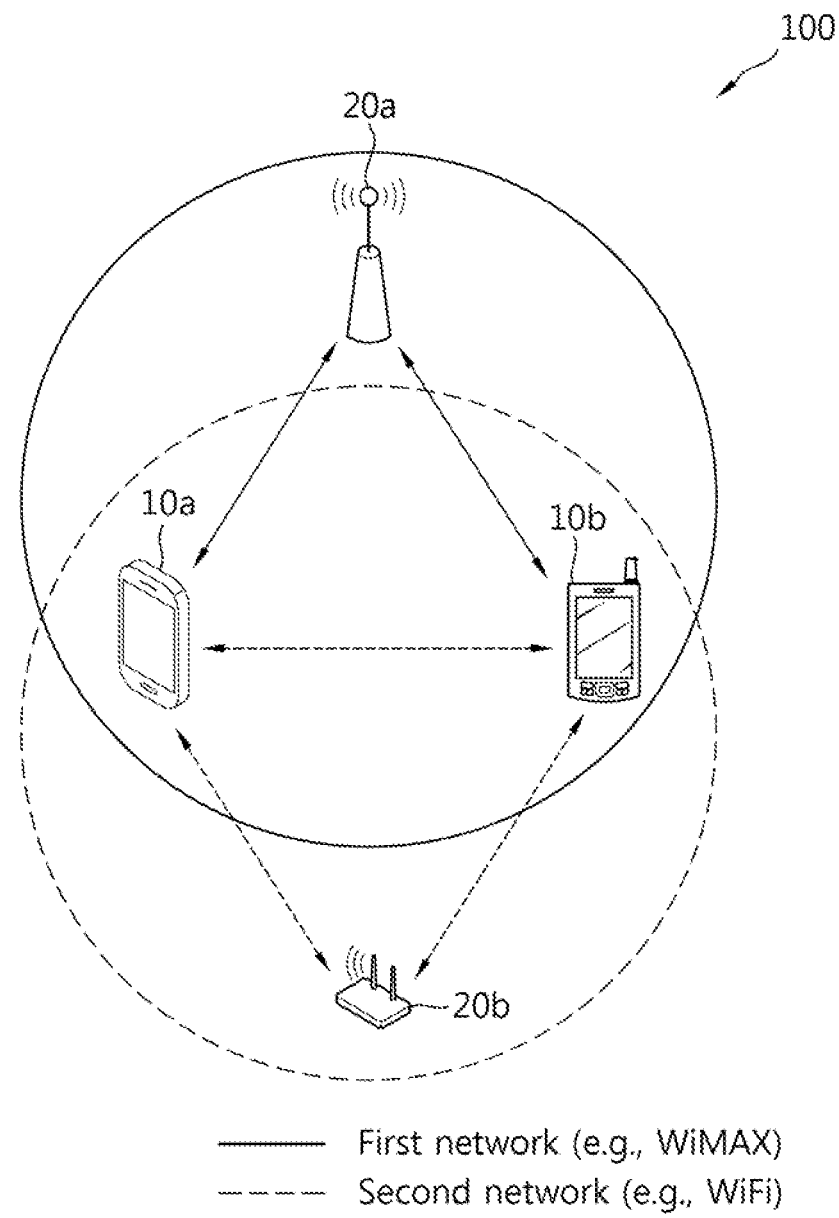
FIG. 2 shows an example of a system performing client cooperation (CC) in a wireless communication environment with two or more heterogeneous networks (multi-RAT) according to an embodiment of the present invention.

FIG. 2 shows an example of a system performing client cooperation (CC) in a wireless communication environment with two or more heterogeneous networks (multi-RAT) according to an embodiment of the present invention.

In a mobile communication system, a user equipment may receive information over a downlink from a base station, and the user equipment may transmit information over an uplink. Information transmitted/received from/to the user equipment includes data and various types of control information, and various physical channels are provided depending on the type and purpose of information transmitted/received from/to the user equipment.

In the current communication environment, two or more heterogeneous networks different from each other may be present. For example, various heterogeneous networks such as a WiMax network, which is an exemplary mobile communication system network, and a Wi-Fi network may be provided. The heterogeneous network refers to a network that adopts a communication scheme different from a communication scheme used in a specific network, and the heterogeneous device refers to a device that belongs to the heterogeneous network adopting the different communication scheme from that of the specific network.

For example, with respect to the WiMAX network and the device belonging to the WiMAX network, since the WiFi network uses a different communication scheme from that used in the WiMAX network, the WiFi network is a heterogeneous network, and the device belonging to the WiFi network is a heterogeneous device. With respect to the WiFi network, the WiMAX network would be a heterogeneous network, and the device belonging to the WiMAX network would be a heterogeneous device.

As used herein, the "multimode MS" refers to a device supporting use of two or more heterogeneous networks (or a plurality of RATs). The Wi-Fi refers to an local area network (LAN) that may provide high-speed Internet access within a predetermined range of a place where an access point (AP) is installed. The Wi-Fi uses a radio frequency (RF) or an infrared (IR) transmission scheme and is often referred to as wireless LAN.

In a wireless communication environment, a multimode MS may use a heterogeneous network provided to support a heterogeneous device in addition to the radio access technology (RAT) being serviced, in order to perform efficient signal transmission and reception or in order to enhance throughput. The RAT is a type of technology used for radio access. For example, the RAT includes GSM/EDGE radio access network (GERAN), UMTS terrestrial radio access network (UTRAN), evolved-UMTS terrestrial radio access network (E-UTRAN), WiMAX, LTE (-A), and Wi-Fi. In the same area, GERAN, UTRAN, E-UTRAN, WiMAX, and/or Wi-Fi may be mixed.

At this time, the multimode MS, which supports a plurality of RATs to enable use of two or more heterogeneous networks, is not restricted to a specific RAT and may transmit and receive signals using other RATs to be able to receive the best service in the current device situation. The number of heterogeneous networks (a plurality of RATs) accessed by the multimode MS to perform signal transmission and reception may be two or more. Accordingly, the multimode MS may conduct signal transmission and reception with or in cooperation with each of base stations using RATs different from the serving base station or base stations using a heterogeneous network (heterogeneous RAT).

Referring to FIG. 2, in the wireless communication system 100, an MS may transmit and receive signals using two or more heterogeneous networks (or a plurality of RATs).

In FIG. 2, as an example, an MS transmits and receives signals using a first network (e.g., WiMAX network) and a second network (e.g., Wi-Fi network). In the wireless communication system, a first MS 10a and a second MS 10b are multimode MSs that may use two or more heterogeneous networks, that is, may support multi-RATs.

In other words, as shown in FIG. 2, the first MS 10a and the second MS 10b support a multimode to be able to transmit and receive signals through the WiMAX network and the Wi-Fi network that are heterogeneous networks with respect to each other.

At this time, in the wireless communication system 100, there may be a base station (20a, BS) over the first network (WiMAX network). In the wireless communication system, the first MS 10a and the second MS 10b supporting the multi-RAT may transmit and receive signals through the first network (WiMAX network).

Further, in the wireless communication system, there may be an access point (20b, AP) corresponding to a base station in the second network (Wi-Fi network). In the wireless communication system, the first MS 10a and the second MS 10b supporting the multi-RAT may transmit and receive signals through the second network (Wi-Fi network).

That is, in the wireless communication system 100, the first MS 10a and the second MS 10b may perform communication through the access point 20b according to the configuration of the infrastructure mode or may directly communicate with each other according to the configuration of the Ad-hoc mode. Hereinafter, although no specific mention is made on the access point 20b, the first MS 10a and the second MS 10b are assumed to be able to transmit and receive signals therebetween through the second network (WiFi network).

As used herein, client cooperation (CC) performed between the first MS 10a and the second MS 10b is assumed to be performed for the second network (Wi-Fi network) corresponding to a direct link between MSs, which is different from the first network (WiMAX network) corresponding to a cellular network. As such, an example of the direct link between MSs is a Wi-Fi network in the present invention, but is not limited thereto.

Meanwhile, the first MS 10a and the second MS 10b are grouped or paired to transmit and receive signals through client cooperation (CC). The grouping or pairing of the first MS 10a and the second MS 10b may be done by a method of determining a counterpart MS to perform client cooperation and sending a request by one of the MSs or by a method of indicating information of MSs to perform client cooperation by the base station 20a.

FIG. 3 shows a concept of a cooperative cluster of mobile stations according to an embodiment of the present invention.

As shown in FIG. 3, cooperation-capable MSs may be bundled into a virtual group that is referred to as a cooperative cluster 10'. Here, the cooperative cluster 10' may be also referred to by terms such as client cooperation connection or MS pairing.

Specifically, as shown in FIG. 3(a), the cooperative cluster 10' may include all MSs that may perform client cooperation, or as shown in FIG. 3(b), the cooperative cluster 10' may include cooperation-capable MSs based on geometry information.

The cooperative cluster 10' may be generated by the base station when the MS enters the base station (so-called "network entry"), or may be generated by establishing a direct cooperative relationship between the MSs.

In case the base station generates the cooperative cluster 10', information on the cooperative cluster may be periodically broadcast by the base station. Or, in response to an MS' request, the information on cooperative cluster 10' may be unicast to each MS.

If the MSs, by themselves, form the cooperation cluster, the information on the cooperation cluster may be unicast or multicast by the MSs or any MS.

Meanwhile, FIG. 3 shows an example where the cooperation cluster is generated only for MSs belonging to a cell of a single base station in client cooperation.

Performing Mode of Client Cooperation Between MSs

Figure 4:
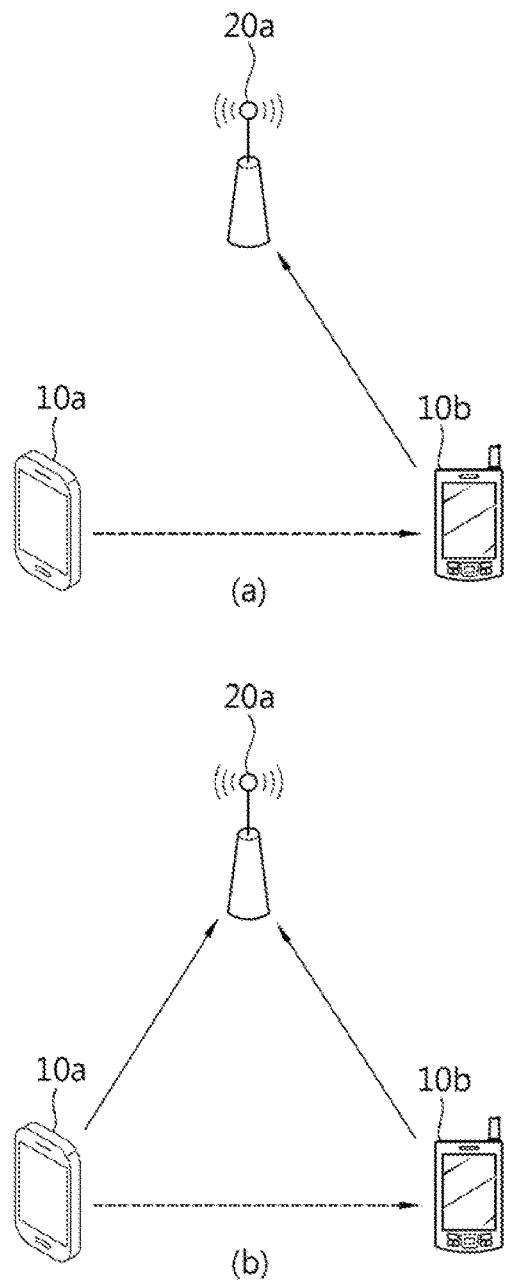
FIGS. 4(a) and (b) shows an example of client cooperation structure according to an embodiment of the present invention.

FIGS. 4(a) and (b) shows an example of client cooperation structure according to an embodiment of the present invention.

Referring to FIGS. 4(a) and (b), modes in which MSs supporting the multi-RAT perform client cooperation (CC) are described. Hereinafter, for ease of distinction, the term "mode" is used, but is not limited thereto.

In FIGS. 4(a) and (b), the first MS 10a and the second MS 10b have a relationship of performing client cooperation (CC). The first MS 10a operates as a source MS (S-MS) attempting to transmit data to the base station 20, and the second MS 10b operates as a cooperative MS (C-MS) assisting in data transmission and reception of the first MS 10a through client cooperation (CC).

Client cooperation (CC) of the MS supporting the multi-RAT may be applicable to when a large propagation loss occurs in the RAT between the source MS and the base station or when the channel status is not good, and other cases such as when the state of the source MS needs it (e.g., short of remaining battery) irrespective of the channel stat or when a user of the source MS requests quick/emergent transmission.

As such, the multi-RAT supportive MS may operate in a relaying mode or in a cooperative communication mode to perform data transmission and reception through client cooperation.

FIG. 4(a) shows an example where a multi-RAT supportive MS performs client cooperation (CC) in accordance with the relaying mode. In the relaying mode, the source MS (S-MS) attempting to transmit data to the base station transmits data to the cooperative MS (C-MS), and the cooperative MS (C-MS) transmits the data received from the source MS (S-MS) to the base station.

Further detailed description is given with reference to FIG. 4(a). The source MS 10a that supports multi-RAT transmits data to the cooperative MS 10b through a RAT corresponding to a direct link, i.e., second network, and the cooperative MS 10b transfers the received data to the base station 20 through an RAT, i.e., first network, which is different from the RAT corresponding to the direct link. As such, the cooperative MS 10b needs to be assigned with an uplink resource (UL resource) for data transmission. At this time, the uplink resource may be assigned by the base station 20 in response to a request from the source MS 10a or the cooperative MS 10b.

FIG. 4(b) shows an example where a multi-RAT supportive MS performs client cooperation (CC) in accordance with the cooperative communication mode. In the cooperative communication mode, the source MS (S-MS) attempting to send data to the base station transmits data to the cooperative MS (C-MS), and the source MS (S-MS) and the cooperative MS (C-MS) cooperate to transmit data to the base station.

Further detailed description is made with reference to FIG. 4(b). The source MS 10a supporting multi-RAT transmits data to the cooperative MS 10b through a RAT corresponding to a direct link, i.e., second network, and the source MS 10a and the cooperative MS 10b perform cooperative communication through the first network that is a RAT different from the RAT corresponding to the direct link, thereby transferring the received data to the base station 20.

Hereinafter, a method for performing device-to-device cooperative transmission (D2D_CT) through a multi-carrier operation will be described in detail.

Here, the multi-carrier operation means transmitting and receiving signals by performing carrier switching in the case of a device supporting a single carrier, and means transmitting and receiving signals by using multi-carriers in the case of a device supporting the multi-carriers. Hereinafter, for convenience of description, device-to-device cooperative transmission will be expressed by 'D2D_CT'.

Figure 5:
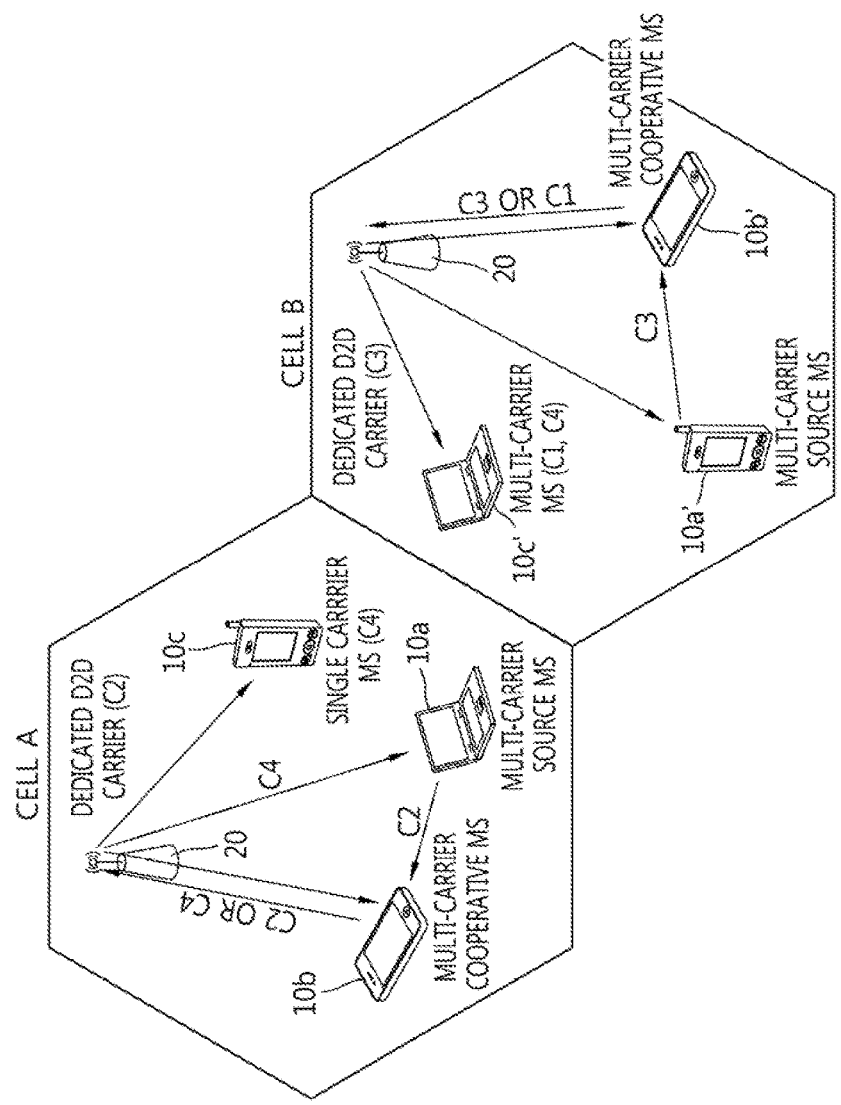
FIG. 5 shows an example of a wireless access system that performs device-to-device cooperative transmission through a multi-carrier operation according to an embodiment of the present invention.

FIG. 5 shows an example of a wireless access system that performs device-to-device cooperative transmission through a multi-carrier operation according to an embodiment of the present invention.

First, MSs in a cell (including a source MS and a cooperative MS) may perform a single carrier operation and a multi-carrier operation in order to transmit and receive signals between base stations or MSs. As shown in FIG. 5, MSs 10c and 10c' supporting the single carrier (SC_MS) and MSs 10a, 10b, 10a', and 10b' supporting the multi-carrier (MC_MS) exist in each cell.

Referring to FIG. 5, in a cell A Cell_A, a 'carrier 2 C2' is allocated as a device-to-device cooperative transmission dedicated carrier for performing the D2D_CT, and in a cell B Cell_B, a 'carrier 3 C3' is allocated as a device-to-device cooperative transmission dedicated carrier for performing the D2D_CT. Hereinafter, the dedicated D2D carrier allocated for performing the D2D_CT is referred to as a 'dedicated carrier'.

The MSs 10a, 10b, and 10c included in the cell A transmit and receive signals by using the base station and a 'carrier 4 C4'. Here, the carrier which transmits and receives the signals between the MSs and the base station is represented by a primary carrier, an access carrier, or a fully configured carrier, in distinction from the dedicated carrier used for the D2D_CT. Hereinafter, the carrier is represented by the 'primary carrier'.

Further, when the source MS and the cooperative MS perform the D2D_CT, the source MS transmits an uplink signal to the cooperative MS through the dedicated carrier 'C2', and the cooperative MS receiving the uplink signal transmits the uplink signal received from the source MS to the base station through the dedicated carrier 'C2' or the primary carrier 'C4'.

Like this, the MSs 10a', 10b', and 10c' included in the cell B transmit and receive signals by using the base station and the primary carrier 'C1' or 'C4'. Further, when the source MS and the cooperative MS perform the D2D_CT, the source MS transmits an uplink signal to the cooperative MS through the dedicated carrier 'C3', and the cooperative MS receiving the uplink signal transmits the uplink signal received from the source MS to the base station through the dedicated carrier 'C3' or the primary carrier 'C1'.

As shown in FIG. 5, the base station may allocate one or a plurality of dedicated carriers to the MSs in the cell by using two methods (cell specific or MS specific) so that the MSs in the cell efficiently perform the D2D_CT. Hereinafter, the two methods will be described in detail.

1. Dedicated Carrier Allocation for D2D_CT in a Cell-specific Manner

First, a method of allocating dedicated carriers for D2D_CT to the MSs in the cell by the base station in a cell-specific manner will be described.

The base station commonly sets a dedicated carrier for each cell or in all cells.

Here, since the dedicated carrier is a carrier set for performing D2D cooperative transmission (or communication), it is preferable that the dedicated carrier may have a form such as a partially configured carrier, but is not limited thereto, and may have a form of the fully configured carrier.

Here, in the case where the base station sets the dedicated carrier for each cell, the base station may transmit the information regarding (alternatively, associated with) the dedicated carrier to the MSs in the cell, particularly, the MSs for performing the D2D_CT by masking information regarding the dedicated carrier by using a cell ID Cell_ID of each cell or a base station ID BS_ID of each base station or through a signal including the cell ID or the base station ID. Here, the information regarding the dedicated carrier may mean information regarding a configuration, a type, the number, and an index of the dedicated carrier.

Further, the base station may transmit the information regarding the dedicated carrier to the MSs in the cell through broadcast/multi-cast/uni-cast signaling. Here, the base station does not take part in the D2D_CT (Non-D2D), but may transmit the information regarding the dedicated carrier through broadcast or multi-cast signaling, in order to limit a use for the dedicated carrier of the MS which performs the multi-carrier operation in the cell or avoid duplication of the same carrier.

As an example, the information regarding the dedicated carrier may be transmitted through a broadcast signal such as a preamble, a superframe header (SFH), and an A-MAP which the base station transmits, in a network (re)entry process so that the MSs existing in the cell or entering the cell transmit and receive the signals to and from the base station. In this case, the broadcast signal includes a physical index or a logical index of the dedicated carrier.

As shown in FIG. 5, the MSs in the cell may receive the broadcast or multi-cast signal from the base station through a primary carrier which accesses the base station.

Hereinafter, a method of allocating a dedicated carrier will be described with reference to FIGS. 6 and 7.

Figure 6:
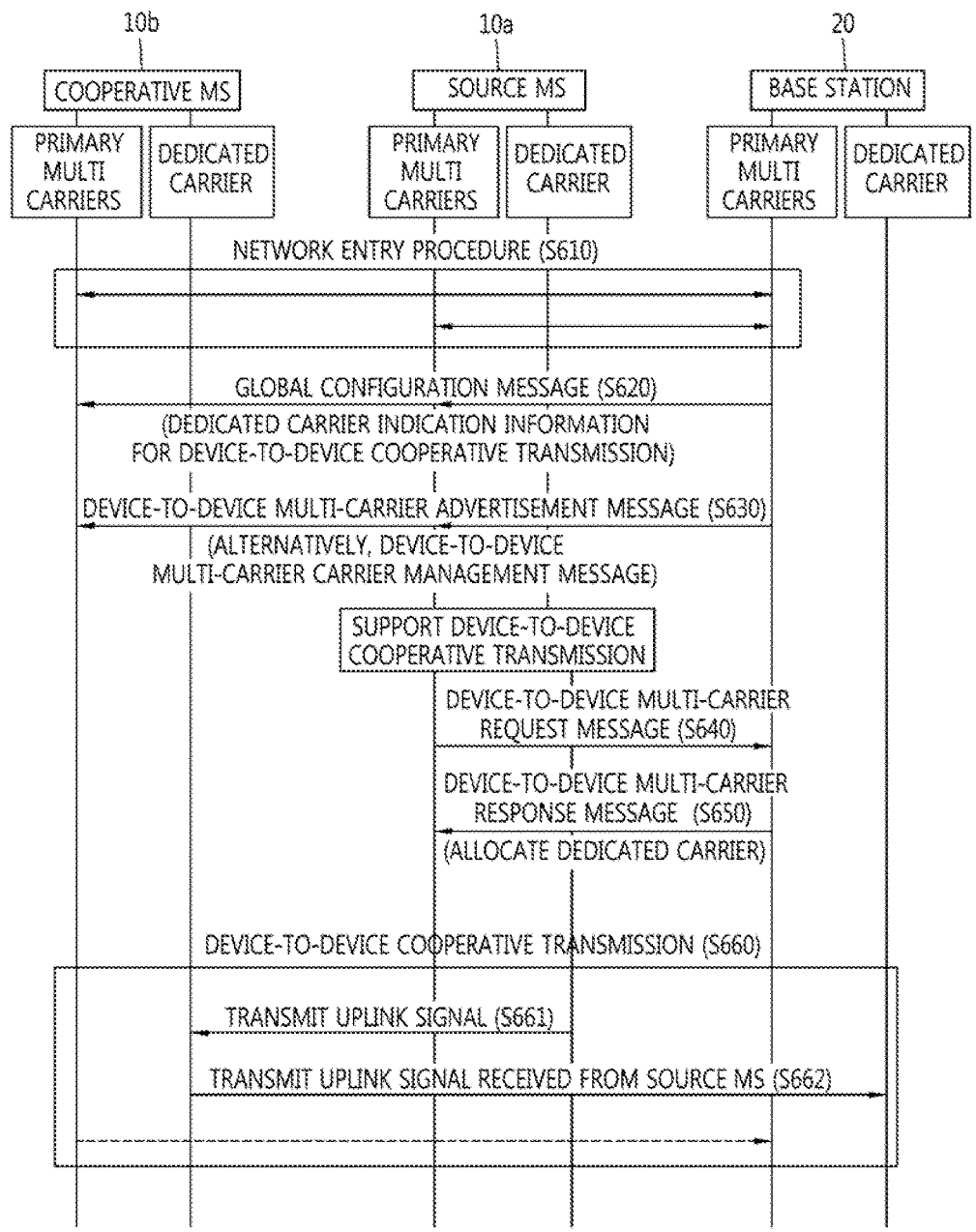
FIG. 6 is a flowchart showing a method of allocating a dedicated carrier according to an embodiment of the present invention.

FIG. 6 is a flowchart showing a method of allocating a dedicated carrier according to an embodiment of the present invention.

Referring to FIG. 6, the base station performs a network (re)entry procedure through MSs (including a source MS and a cooperative MS) in a cell through a primary carrier (S610). As described above, the primary carrier means a carrier which accesses the base station or transmits and receives the signal to and from the base station in an accessed state.

Thereafter, the base station transmits indication information regarding a dedicated carrier allocated for the D2D_CT among carriers supported by the base station, to the MSs (S620). Here, the indication information regarding the dedicated carrier may be transmitted to the MSs through a global_CFG (configuration)_message which is the broadcast signal.

SC-MSs supporting a single carrier and MC-MSs supporting the multi-carriers in the cell which receive the indication information regarding the dedicated carrier through the broadcast signaling restrict a use for the received dedicated carrier.

Accordingly, when the multi-carrier operation such as primary carrier change or secondary carrier setting is performed while the signal is transmitted and received to and from the base station, the same carrier may not be duplicated by using other carriers supported by the base station except for the dedicated carrier, and an effect of interference due to other MSs may be reduced during the D2D cooperative communication.

The indication information regarding the dedicated carrier may include information such as a physical carrier index, a duplex, a center frequency, a carrier type, a carrier configuration of the dedicated carrier.

Thereafter, the MSs in the cell may determine management (or operation) information regarding the dedicated carrier through a management signal for the dedicated carrier transmitted by the base station (S630). The management information may be information indicating activation or inactivation of the dedicated carrier, and information indicating a change of the primary carrier for D2D_CT. Further, the management information may be transmitted to the MSs through a D2D multi-carrier advertisement (D2D_MC_ADV) message or a D2D multi-carrier carrier management (D2D_MC_CM) massage.

Next, the MC_S-MS supporting the multi-carrier transmits a usage request of the dedicated carrier to the base station through a D2D multi-carrier request (D2D_MC_REQ) message in order to perform the D2D_CT (S640). Here, the source MS supports the D2D_CT.

Next, the base station receiving the D2D_MC_REQ message from the source MS transmits a D2D multi-carrier response (D2D_MC_RSP) message including assignment information regarding the dedicated carrier and carrier indication information representing the dedicated carrier to the source MS and/or the cooperative MS (S650). The D2D_MC_RSP message represents a response to the D2D_MC_REQ message.

Next, the source MS performs the D2D_CT by using the dedicated carrier allocated from the base station (S660). That is, the source MS transmits the uplink signal to the cooperative MS by using the dedicated carrier (S661), and the cooperative MS transmits the uplink signal received from the source MS to the base station by using the primary carrier and/or the dedicated carrier (S662).

In the case where the source MS is the SC_MS supporting the single carrier operation, the source MS receives the D2D_MC_RSP message from the base station and then performs the D2D_CT with the cooperative MS through the primary carrier change operation (carrier switching from the primary carrier to the dedicated carrier).

Further, when the source MS performs the D2D_CT with the cooperative MS through the dedicated carrier, information regarding the D2D_CT may be received from the base station through the primary carrier or the dedicated carrier which accesses the base station.

As shown in FIG. 6, the dedicated carrier allocated for the D2D_CT may be used for only the D2D_CT, and the signal transmission and reception between the base station and the MSs may use the carrier accessing the base station, that is, the primary carrier.

As shown in FIG. 5, the signals for the D2D_CT are transmitted and received between the MC_C-MS and the MC_S-MS in the Cell_A by using the dedicated carrier C2 allocated by the base station, and the signal received from the MC_S-MS may be transmitted to the base station by using the primary carrier C4 which accesses the base station to transmit and receive the signal between the MC_C-MS and the base station.

Further, unlike this, when the signals are transmitted to and received from the base station by using the dedicated carrier, the primary carrier accessed by the MS is changed into the dedicated carrier and the operation may be performed. In this case, the MC_C-MS may transmit the signal to the base station through the allocated dedicated carrier for the D2D_CT, and control information regarding the D2D_CT may be received from the base station through the dedicated carrier.

2. Dedicated Carrier Allocation for D2D_CT in a Ser-specific Manner

When the SC-MSs and MC-MSs in the cell access the base station, information regarding the carrier supported by the base station is received through a global message transmitted by the base station. The information regarding the carrier supported by the base station may be the number of carrier, a carrier index, a carrier configuration, a duplex mode, a frequency, a carrier type, and the like for the supported carrier. The source MS receiving the information regarding the carrier may follow a procedure like the following FIG. 7 in order to be allocated with a carrier for the D2D_CT among cells supported in the cell.

Figure 7:
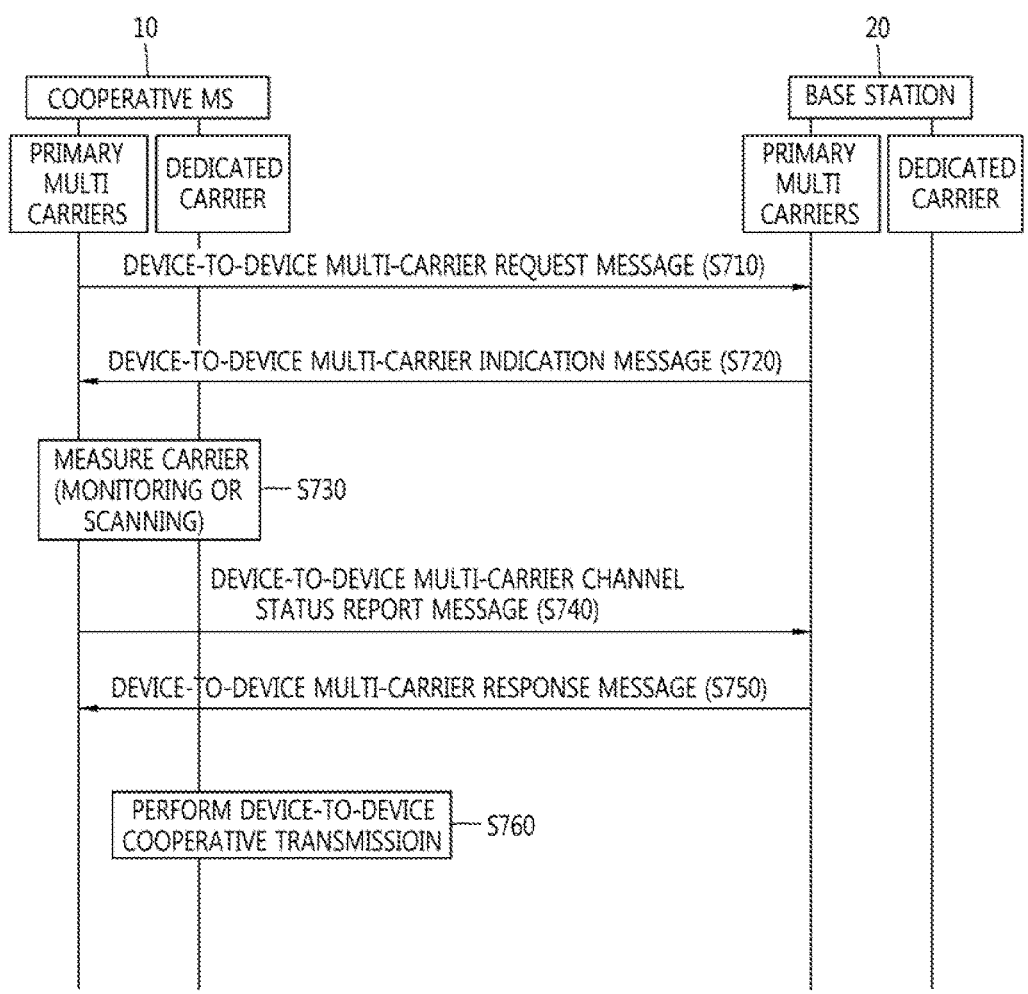
FIG. 7 is a flowchart showing a method for allocating a dedicated carrier used for D2D_CT according to another embodiment of the present invention.

FIG. 7 is a flowchart showing a method for allocating a dedicated carrier used for D2D_CT according to another embodiment of the present invention.

Referring to FIG. 7, the base station transmits information regarding carriers supported in a cell to MSs (including a source MS and a cooperative MS) in the cell through a global message.

Next, an MS MC_MS supporting a multi-carrier operation transmits a D2D_MC-REQ signal (or a message) to the base station in order to request allocation or assignment of a dedicated carrier for D2D_CT so as to perform the D2D_CT (S710). The D2D_MC_REQ signal may include candidate D2D_CT indication and information regarding a candidate carrier for performing the D2D_CT.

Next, the base station transmits a D2D multi-carrier indication (D2D_MC_IND) message (or signal) which indicates measurement for the carriers requested by the source MS so that the source MS performs monitoring or scanning of the dedicated carriers to the source MS and/or the cooperative MS (S720).

Here, the D2D_MC_IND message may include information such as the number of available carriers, a list of carrier, a carrier index, a carrier state, an operation type, a carrier type, a measurement metric, and a threshold value.

Next, the source MS performs the measurement for each carrier through the monitoring or scanning of the respective carriers by using information included in the D2D_MC_IND message (S730).

Here, the source MS selects a corresponding carrier in the case where a state condition of a channel received through the D2D_MC_IND message is satisfied in a result acquired through the measurement of each carrier, that is, in the case where a threshold value is smaller or higher to make a list. The source MS transmits the prepared carrier list and an output value acquired through the measurement to the base station by using a D2D multi-carrier channel state report (D2D_MC_MSM_RPT) signal.

Next, the base station selects a carrier which the source MS uses for the D2D_CT by using information included in the D2D_MC_MSM_RPT signal received from the source MS.

Next, the base station transmits the D2D_MC_RSP signal including the selected carrier to the source MS and/or the cooperative MS (S750). That is, the source MS performing the D2D_CT described above performs the D2D_CT, by being allocated with an appropriate dedicated carrier from the base station through the measurement of the carriers in the cell (S760).

As described in FIGS. 6 and 7, in order to perform the D2D_CT, the source MS may receive the cell-specific dedicated carrier from the base station or the user-specific dedicated carrier from the base station by the measurement through scanning (or monitoring) of the MS.

Hereinafter, a method for performing D2D_CT through an FDD or TDD type frame structure in a dedicated carrier allocated for the D2D_CT will be described with reference to FIGS. 8 to 11.

Figure 8:
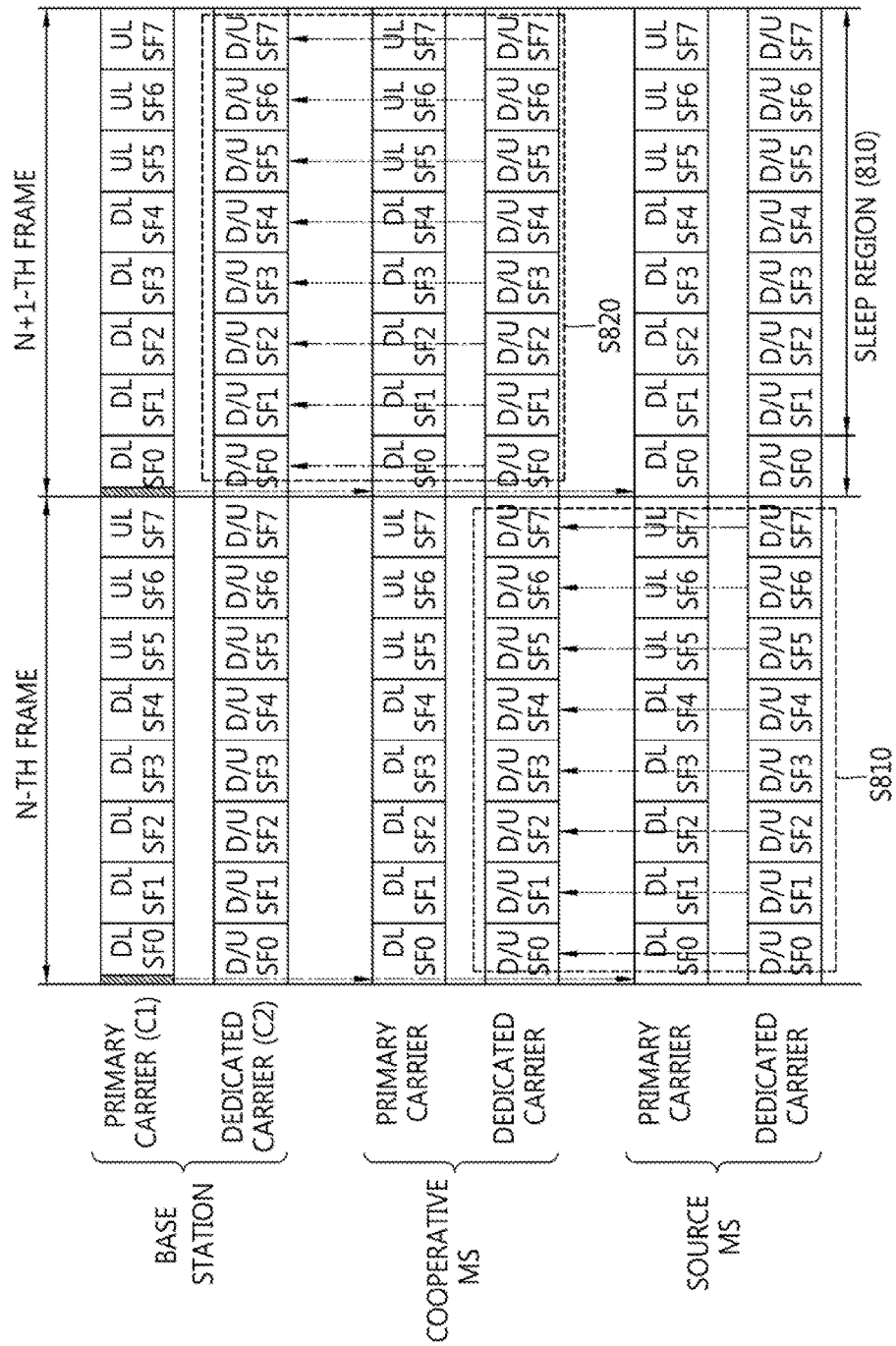
FIGS. 8 and 9 shows a method for performing D2D_CT through an FDD or TDD type frame structure in a dedicated carrier allocated for the D2D_CT according to an embodiment of the present invention.
Figure 9:
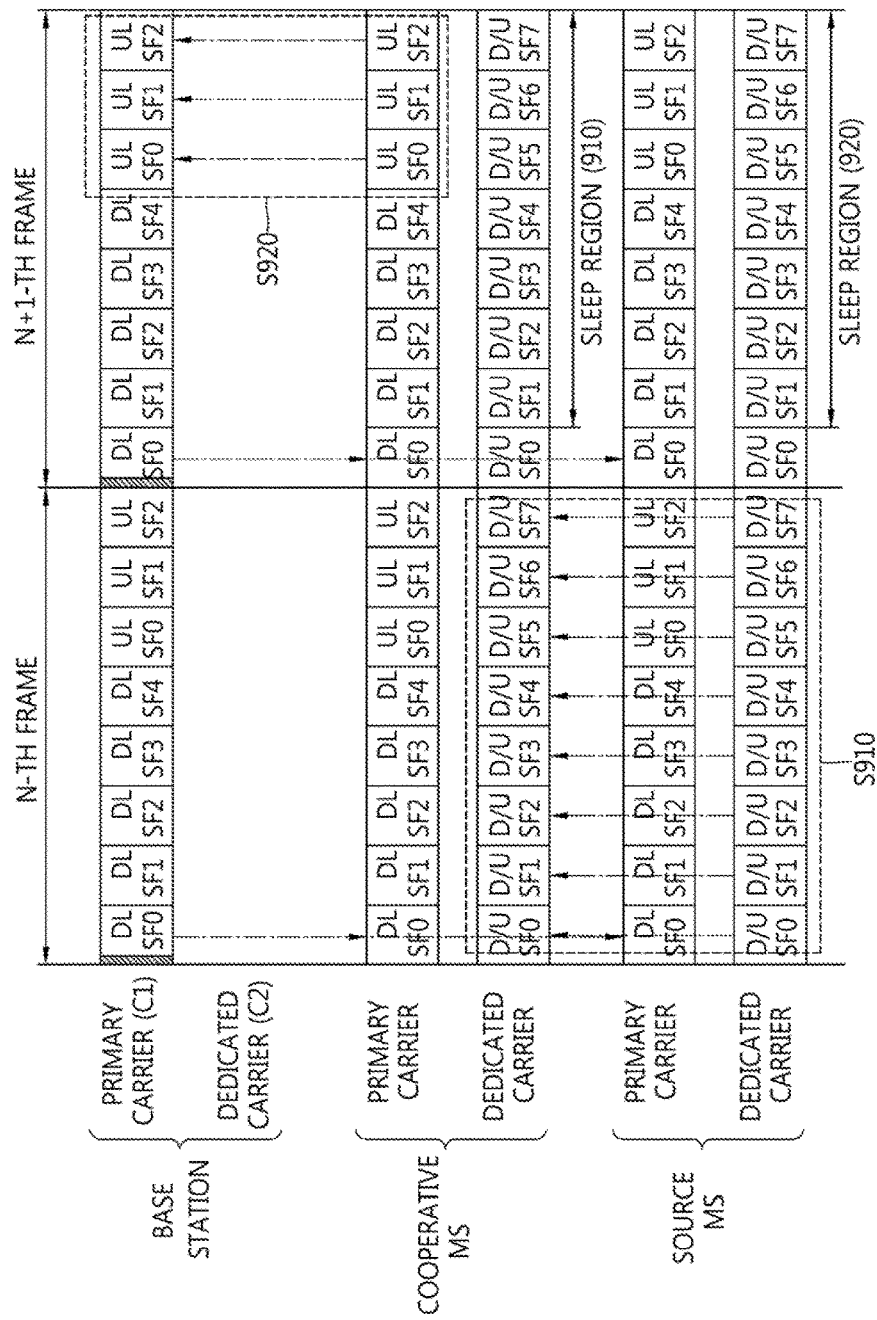

FIGS. 8 and 9 shows a method for performing D2D_CT through an FDD or TDD type frame structure in a dedicated carrier allocated for the D2D_CT according to an embodiment of the present invention. That is, in FIGS. 8 and 9, a primary carrier has a TDD type frame structure, and the dedicated carrier for the D2D_CT has an FDD type frame structure.

First, as shown in FIG. 8, the base station transmits a broadcast signal and control information for D2D_CT to two MSs performing D2D cooperative communication, that is, the source MS and the cooperative MS through a DL subframe (first subframe) of an N-th frame of a primary carrier (carrier 1). Here, the primary carrier means a carrier through which the source MS and the cooperative MS access the base station. Further, the broadcast signal means a control signal such as an A-Preamble, an SFH, and an A-MAP.

The control information regarding the D2D_CT may include information regarding a allocated resource for D2D_CT, a power control for D2D_CT, a modulating and coating scheme (MCS), an MIMO, MS grouping/paring/virtual IDs, and the like.

Here, the base station may transmit the frame structure for the dedicated carrier allocated for performing the D2D_CT and the control information to the MSs through the primary carrier (or access carrier) of each MS or a dedicated D2D_CT carrier allocated for the D2D_CT.

Referring to FIG. 8, the source MS transmits an uplink signal (or data) to the cooperative MS through a UL subframe of an N-th frame of the dedicated carrier (carrier 2) received from the base station (S810). In this case, the cooperative MS receives the uplink signal from the source MS through the UL subframe of the same frame (N-th frame).

Next, the cooperative MS transmits the uplink signal received from the source MS to the base station through the UL subframe of the dedicated carrier (carrier 2) in the next frame, that is, an N+1-th frame (S820). In this case, the source MS may operate by a power sleeping mode in the N+1-th frame, before the uplink signal is transmitted to the cooperative MS in an N+2-th frame. That is, as shown in FIG. 8, the source MS enters into a sleep mode in the N+1-th frame, after the uplink signal is transmitted to the cooperative MS in the N-th frame.

Further, in the dedicated carrier (carrier 2), the cooperative MS operates only by the UL mode. The cooperative MS transmits and receives data to and from the source MS and/or the base station by switching the UL subframe into a Tx region (Tx mode) and an Rx region (Rx mode) as a frame unit.

In FIG. 8, the cooperative MS transmits the signal received from the source MS to the base station by using the UL subframe of the dedicated carrier which the cooperative MS is allocated with from the base station. Unlike this, FIG. 9 shows a method in which the cooperative MS receives the uplink signal from the source MS through the UL subframe of the dedicated carrier, and transmits the uplink signal received from the source MS to the base station through the UL subframe of the primary carrier.

Similarly to the process of FIG. 8, in the case of performing the D2D_CT, the cooperative MS receives a signal from the source MS by using the UL subframe of the dedicated carrier in the N-th frame (S910) and transmits the uplink signal received from the source MS to the base station by using the UL subframe of the primary carrier in the next frame, that is, the N+1-th frame (S920). In this case, in the frame (N+1-th frame) in which the cooperative MS transmits the signal of the source MS to the base station, the source MS and the cooperative MS perform a sleeping mode operation for the D2D carrier, in which the signal is not transmitted to the D2D carrier (S910 and S920).

When the signal is not received from the base station, the source MS and the cooperative MS operate by the sleeping mode even in the same frame in the primary carrier, thereby reducing power consumption of the MS.

Further, the source MS and the cooperative MS may transmit and receive the signals to and from the base station in the first subframe of each frame in order to maintain synchronization with the base station and receive the broadcast signal such as a preamble, and an SFH transmitted by the base station in the D2D carrier. In this case, the source MS and the cooperative MS transmit and receive the signals to and from the base station through the primary carrier.

In the carrier accessed by each MS, that is, the primary carrier, since the cooperative MS does not use the UL subframe in the N-th frame where the source MS transmits the signal, and uses the UL subframe in the next frame, that is, the N+1-th frame, the cooperative MS alternately operates in an active mode and a sleep mode in the UL subframe for each frame unit.

Further, since the source MS does not transmit the signal through the UL subframe in the access carrier, the source MS may operate in the sleep mode in the UL subframe for each frame.

Figure 10:
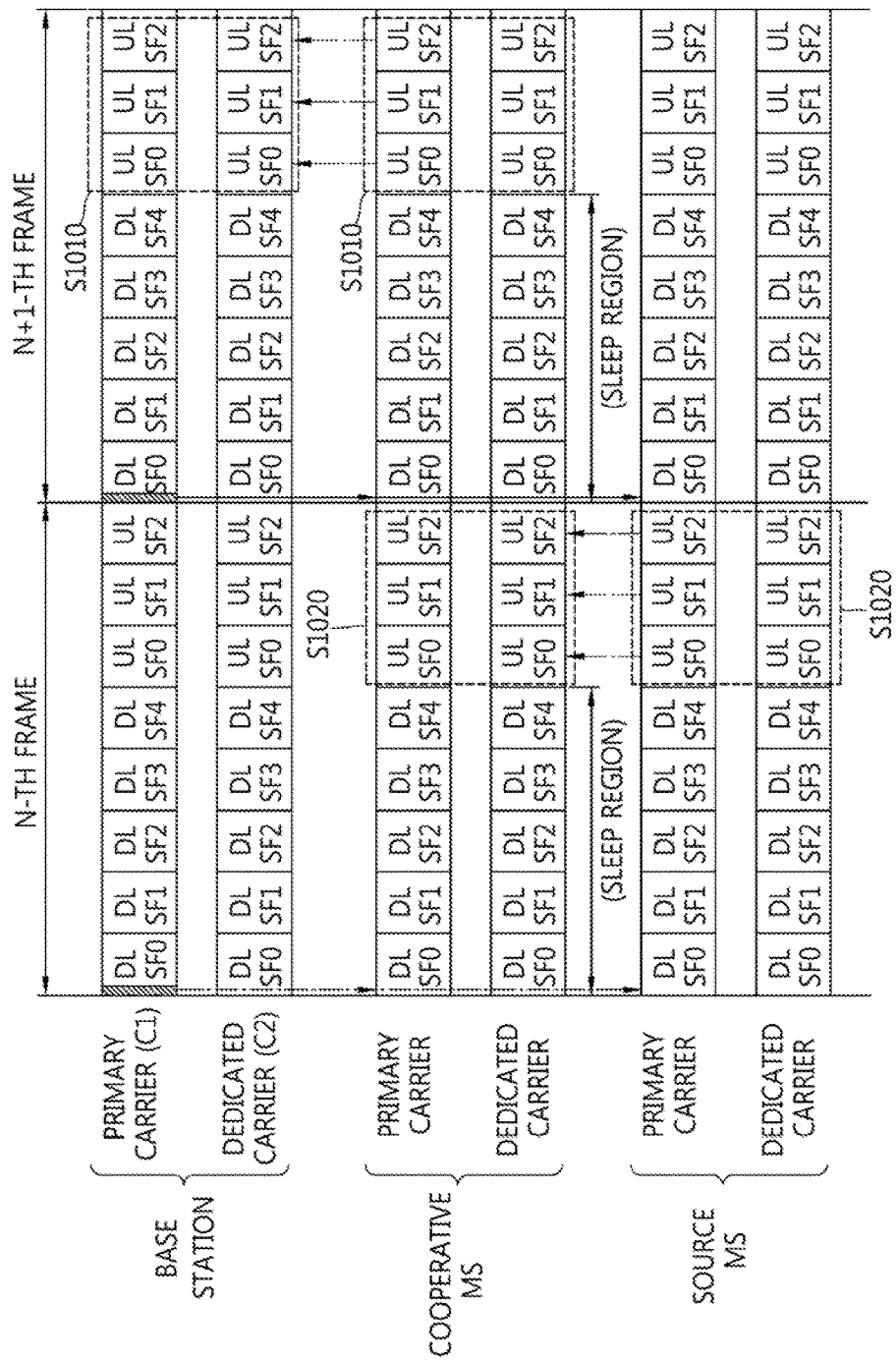
FIGS. 10 and 11 shows a method for performing D2D_CT according to a TDD type frame structure in a dedicated carrier allocated for the D2D_CT according to an embodiment of the present invention.
Figure 11:
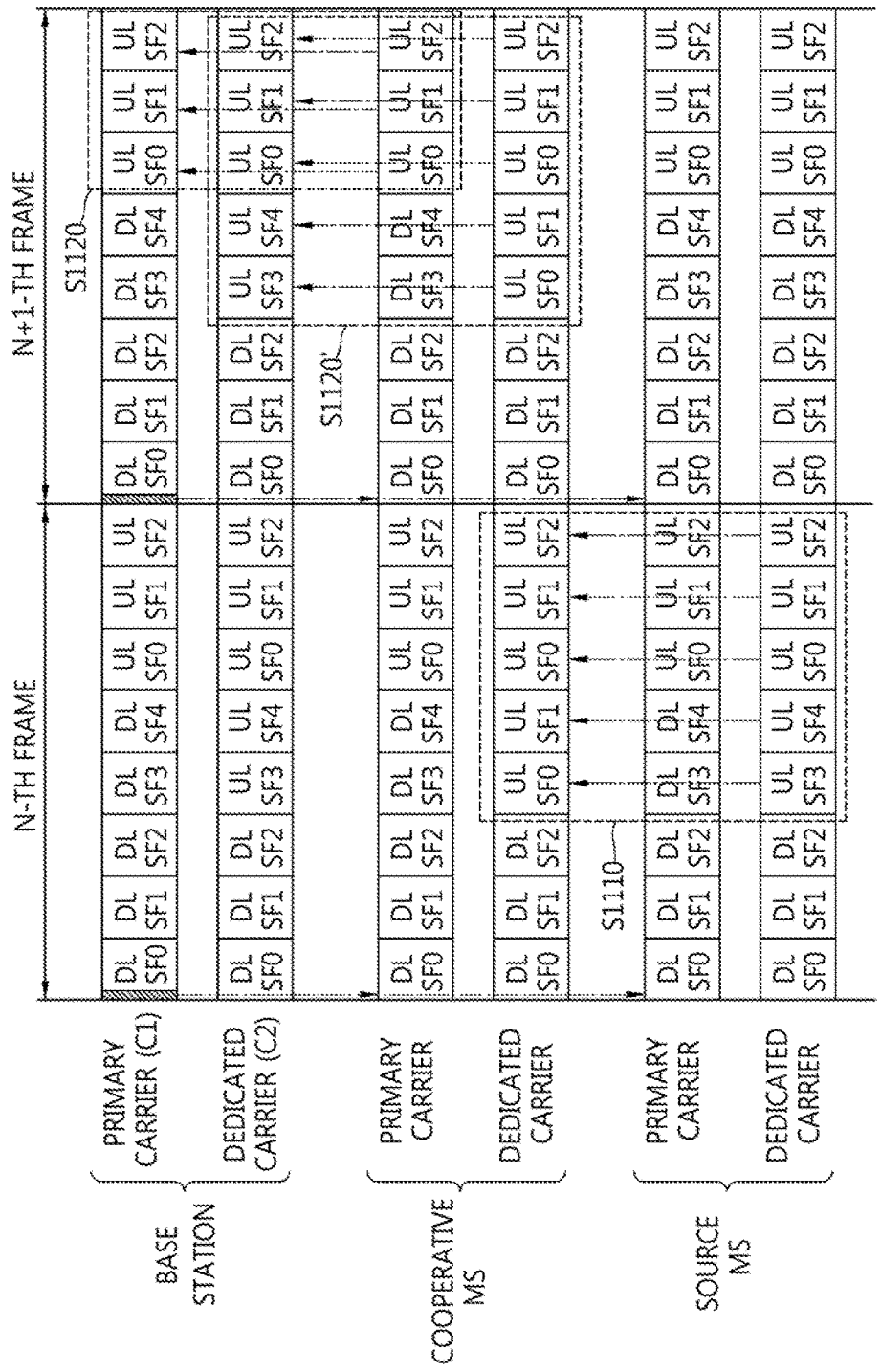

FIGS. 10 and 11 shows a method for performing D2D_CT according to a TDD type frame structure in a dedicated carrier allocated for the D2D_CT according to an embodiment of the present invention. That is, in FIGS. 10 and 11, both a primary carrier and a dedicated carrier for D2D_CT have TDD type frame structures.

In the case of performing the D2D_CT by using a D2D dedicated carrier supporting the TDD, the base station may perform D2D cooperative communication, by applying multi-carrier aggregation with respect to an UL region of the dedicated carrier assigned for the D2D_CT. The frame structures are described in FIGS. 10 and 11.

First, referring to FIG. 10, the base station allocates a carrier adjacent to a primary carrier accessing the base station, that is, the access carrier to the MSs performing the D2D_CT for the D2D_CT, that is, the source MS and the cooperative MS as the dedicated carrier for performing the D2D_CT. In this case, information (carrier index, center frequency, type, duplex, carrier configuration, and the like) regarding the dedicated carrier may be transmitted to respective MSs through the D2D_MC-RSP message or the D2D_MC-IND message described above.

Control information (allocation, number of RB, guard carrier usage, duration) regarding an aggregated UL subframe of two carriers (the primary carrier and the dedicated carrier) used for the D2D_CT may be transmitted to respective MSs through a DL subframe by using a DL control signal of the primary carrier.

As shown in FIG. 10, the source MS transmits an uplink signal to the cooperative MS by using an aggregated UL subframe in an N-th frame of the primary carrier and the D2D assigned carrier. Further, the cooperative MS transmits the uplink signal received from the source MS to the base station by using an aggregated UL subframe of the next frame, that is, the N+1-th frame (S1020).

Further, since the source MS and the cooperative MS transmit and receive the signals by using only the aggregated UL subframe of two carriers, the source MS and the cooperative MS may operate in a sleep mode in the rest of subframes other than a subframe (first DL subframe in frame) receiving a signal such as a broadcast signal (A-Preamble, SFH, and A-MAP) transmitted from the base station in the DL region of the assigned carriers (the primary carrier and the D2D dedicated carrier) (S1010 and S1020).

Unlike FIG. 10 which shows the frame structure using the UL aggregation of the multi-carrier supporting the TDD for D2D_CT, FIG. 11 shows performing the D2D_CT by using the frame structure having a different frame configuration of the two carriers (the primary carrier and the D2D dedicated carrier).

That is, in the case of FIG. 11, in the D2D_CT, since the source MS and the cooperative MS transmit and receive the signals through the UL subframe, the UL subframe is of great importance in the frame. Accordingly, the carrier assigned for the D2D_CT may configure a frame by a DL/UL ratio such as 3:5 and 4:4 in which the UL subframe is higher in ratio.

Referring to FIG. 11, the cooperative MS receives the signal from the source MS through the UL subframe of the N-th frame of the assigned carriers (the primary carrier and the D2D dedicated carrier) (S 1110). Further, the cooperative MS may 1) transmit the signal to the base station by using the UL subframe of the carrier accessing the base station (S1120) or 2) transmit the signal to the base station through the UL subframe of the assigned carrier (S1120'), as shown in FIGS. 8 and 9 in the next frame, that is, the N+1-th frame. In this case, in an UL subframe of another carrier which does not transmit the signal and a DL subframe which does not receive the signal from the base station, the source MS and the cooperative MS switch over to the sleep mode from the active mode, thereby reducing power consumption.

Here, frame configuration information regarding the assigned carrier may be transmitted to the MSs from the base station through the access carrier or transmitted to the corresponding MSs through the SFH of the assigned carrier.

The embodiment of the present invention and their modifications can be combined. Therefore, each embodiment can be implemented in combination as well as in its own. These combinations may be obvious to those skilled in the art from the description of the specification, and so detailed description thereof is omitted. Although the description on the combination has not been included in the specification, those combinations of embodiments shall be interpreted to be within the scope of the present invention.

The above-described embodiments and modifications may be made by various means, for example, in hardware, firmware, software, or in a combination thereof.

When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 12.

Figure 12:
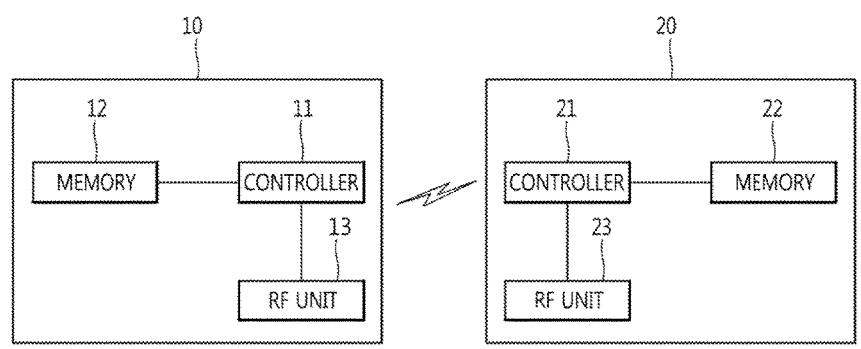
FIG. 12 is a block diagram showing internal structures of an MS and a BS in a wireless access system according to an embodiment of the present invention.

FIG. 12 is a block diagram showing internal structures of an MS and a BS in a wireless access system according to an embodiment of the present invention.

An MS 10 includes a controller 11, a memory 12, and a radio frequency (RF) unit 13.

Further, the MS also includes a display unit, a user interface unit, etc.

The controller 11 implements the proposed functions, procedures, and/or methods.

Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in pre-scribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method for performing a device-to-device (D2D) communication by using multi-carriers in a wireless access system, the method comprising:
   receiving, by a device, configuration information for the D2D communication from a base station (BS) via a primary carrier;
   selecting, by the device, at least one dedicated carrier used for the D2D communication with an adjacent device;
   transmitting, by the device and to the BS, information on the selection of the at least one dedicated carrier;
   receiving, from the BS, power control information on a D2D transmission to the adjacent device by using the at least one dedicated carrier; and
   performing, by the device, a D2D reception from the adjacent device or the D2D transmission to the adjacent device by using the at least one dedicated carrier,
   wherein the received configuration information is broadcast within a cell of the BS, and wherein a center frequency of the at least one dedicated carrier is different from a center frequency of the primary carrier, and wherein both of the D2D reception and the D2D transmission use an uplink resource.

2. The method of claim 1, further comprising:

receiving, from the BS, a message including a resource allocation on the at least one dedicated carrier for the D2D communication.

3. The method of claim 1, further comprising:

receiving information on a plurality of carriers to be used for the D2D communication and wherein the received information is configured with an identifier related to the BS.

4. The method of claim 1, further comprising:

performing measurement on the at least one dedicated carrier; and reporting a result of the measurement to the BS.

5. The method of claim 1, wherein the configuration information includes frame structure information indicating a frame structure of the primary carrier or the at least one dedicated carrier.

6. The method of claim 1, further comprising:

transmitting an uplink signal to the adjacent device in an N-th frame; and operating in a power saving mode in subframes other than a first subframe of an (N+1)-th frame.

7. A device for performing a device-to-device (D2D) communication by using multi-carriers in a wireless access system, the device comprising:

a transceiver;

a processor operatively connected to the transceiver and configured to perform:

receiving configuration information for the D2D communication from a base station (BS) via a primary carrier;

selecting at least one dedicated carrier for the D2D communication with an adjacent device;

transmitting, to the BS, information on the selection of the at least one dedicated carrier;

receiving, from the BS, power control information on a D2D transmission to the adjacent device by using the at least one dedicated carrier, and performing a D2D reception from the adjacent device or the D2D transmission to the adjacent device by using the at least one dedicated carrier, wherein the received configuration information is broadcast within a cell of the BS, and wherein a center frequency of the at least one dedicated carrier is different from a center frequency of the primary carrier, and wherein both of the D2D reception and the D2D transmission use an uplink resource.

8. The device of claim 7, wherein the processor is further configured to:

receive an uplink signal from the adjacent device in an N-th frame, and transmit the received uplink signal in an (N+1)-th frame to the BS by using the at least one dedicated carrier or the primary carrier.

9. The device of claim 7, wherein the processor is further configured to perform:

receiving from the BS a message including a resource allocation on the at least one dedicated carrier for the D2D communication.

10. The device of claim 7, wherein the received configuration information includes information on a plurality of carriers to be used for the D2D communication and wherein the received configuration information is configured with an identifier related to the BS.

11. The device of claim 7, wherein the processor is further configured to perform:

measurement on the at least one dedicated carrier; and reporting a result of the measurement to the BS.

12. The device of claim 7, wherein the processor is further configured to perform:

receiving frame structure information from at least a first device or a second device, the frame structure information indicating a frame structure of the primary carrier or the at least one dedicated carrier.

13. The method of claim 1, wherein the transmitted information includes information on the adjacent device with which the D2D communication is performed.

14. The method of claim 1, further comprising:

selecting the adjacent device from among a plurality of devices in vicinity of the device.

15. The method of claim 1, wherein the D2D reception or the D2D transmission is performed on a time division duplex (TDD) based uplink subframe.

* * * * *